US008818412B2

(12) United States Patent
Hotes et al.

(10) Patent No.: US 8,818,412 B2
(45) Date of Patent: Aug. 26, 2014

(54) SYSTEM FOR AGGREGATING AND DISSEMINATING LOCATION INFORMATION

(75) Inventors: Scott Hotes, Berkeley, CA (US); Jesse Myers, San Francisco, CA (US); Daniel Hodges, Berkeley, CA (US); Tasos Roumeliotis, Orinda, CA (US)

(73) Assignee: WaveMarket, Inc., Emeryville, CA (US)

( * ) Notice: Subject to any disclaimer, the term of this patent is extended or adjusted under 35 U.S.C. 154(b) by 348 days.

(21) Appl. No.: 12/406,825

(22) Filed: Mar. 18, 2009

(65) Prior Publication Data

US 2010/0240398 A1   Sep. 23, 2010

(51) Int. Cl.
*H04W 24/00* (2009.01)
*H04M 3/42* (2006.01)

(52) U.S. Cl.
USPC .................................. 455/456.2; 455/414.1

(58) Field of Classification Search
USPC .......... 455/456.1, 456.2, 456.3, 456.5, 456.6, 455/414.1, 414.2, 412.1, 412.2, 414.3
See application file for complete search history.

(56) References Cited

U.S. PATENT DOCUMENTS

| | | | |
|---|---|---|---|
| 6,138,003 A | 10/2000 | Kingdon et al. | |
| 6,442,752 B1 | 8/2002 | Jennings et al. | |
| 6,594,483 B2 | 7/2003 | Nykanen et al. | |
| 6,961,855 B1 | 11/2005 | Rich et al. | |
| 6,963,748 B2 | 11/2005 | Chithambaram et al. | |
| 7,054,648 B2 | 5/2006 | Abtin et al. | |
| 7,096,029 B1 | 8/2006 | Parupudi et al. | |
| 7,145,898 B1 | 12/2006 | Elliott | |
| 7,190,960 B2 | 3/2007 | Wilson et al. | |
| 7,210,121 B2 | 4/2007 | Xia et al. | |
| 7,213,048 B1 | 5/2007 | Parupudi et al. | |
| 7,221,947 B2 | 5/2007 | Casey | |
| 7,224,987 B1 * | 5/2007 | Bhela et al. | 455/456.3 |
| 7,333,820 B2 | 2/2008 | Sheha et al. | |
| 7,461,385 B2 | 12/2008 | Winter | |
| 7,536,437 B2 * | 5/2009 | Zmolek | 709/206 |
| 7,784,087 B2 | 8/2010 | Yami et al. | |
| 7,992,195 B2 | 8/2011 | Pfitzmann et al. | |
| 8,243,910 B2 * | 8/2012 | Chen et al. | 379/211.01 |
| 2002/0016173 A1 | 2/2002 | Hunzinger | |
| 2002/0035556 A1 | 3/2002 | Shah et al. | |

(Continued)

OTHER PUBLICATIONS

Google Search, Sep. 4, 2012, Mobile API Permission.

(Continued)

*Primary Examiner* — Christopher M Brandt
(74) *Attorney, Agent, or Firm* — Dovas Law, P.C.

(57) ABSTRACT

A computer-implemented method of aggregating and disseminating location information is provided. The method includes establishing a user account for a user and associating a user identifier with the user account. A request for the user identifier is received from a remote application server. An identifier request authorization is received from the user or the remote application server. The user identifier is provided to the remote application server in response to receiving the identifier request authorization. Mobile device location information of a user mobile device associated with the user identifier is received from the user mobile device or a remote telecommunication carrier server. A request for the mobile device location information is received from the remote application server. A location request authorization is received from the user, and the user mobile device location is provided to the remote application server in response to receiving the location request authorization. Systems for aggregating and disseminating location information are also provided.

30 Claims, 5 Drawing Sheets

(56) References Cited

U.S. PATENT DOCUMENTS

| | | | |
|---|---|---|---|
| 2002/0177449 A1* | 11/2002 | McDonnell et al. | 455/456 |
| 2003/0035544 A1 | 2/2003 | Herle et al. | |
| 2003/0060214 A1 | 3/2003 | Hendrey et al. | |
| 2003/0110076 A1 | 6/2003 | Holt | |
| 2004/0025022 A1 | 2/2004 | Yach et al. | |
| 2004/0143457 A1 | 7/2004 | Demirian et al. | |
| 2004/0198374 A1* | 10/2004 | Bajikar | 455/456.1 |
| 2004/0266457 A1 | 12/2004 | Dupray | |
| 2005/0010780 A1 | 1/2005 | Kane et al. | |
| 2005/0048948 A1* | 3/2005 | Holland et al. | 455/404.1 |
| 2005/0148342 A1* | 7/2005 | Sylvain | 455/456.3 |
| 2005/0282557 A1 | 12/2005 | Mikko | |
| 2006/0019679 A1* | 1/2006 | Rappaport et al. | 455/456.5 |
| 2006/0135177 A1* | 6/2006 | Winterbottom et al. | 455/456.1 |
| 2006/0137007 A1 | 6/2006 | Paatero et al. | |
| 2006/0167816 A1 | 7/2006 | Wang et al. | |
| 2006/0189328 A1* | 8/2006 | Cedervall et al. | 455/456.3 |
| 2007/0060171 A1 | 3/2007 | Sudit et al. | |
| 2007/0105565 A1* | 5/2007 | Enzmann et al. | 455/456.1 |
| 2007/0136202 A1 | 6/2007 | Noma et al. | |
| 2007/0287473 A1 | 12/2007 | Dupray | |
| 2008/0004043 A1 | 1/2008 | Wilson et al. | |
| 2008/0071686 A1 | 3/2008 | Tayebi et al. | |
| 2008/0113671 A1 | 5/2008 | Ghozati et al. | |
| 2008/0299989 A1* | 12/2008 | King et al. | 455/456.1 |
| 2009/0046677 A1 | 2/2009 | Toledano et al. | |
| 2009/0047972 A1* | 2/2009 | Neeraj | 455/456.1 |
| 2009/0138198 A1 | 5/2009 | Lee et al. | |
| 2009/0157693 A1 | 6/2009 | Palahnuk | |
| 2010/0242097 A1 | 9/2010 | Hotes et al. | |
| 2010/0251340 A1 | 9/2010 | Martin et al. | |
| 2010/0285817 A1* | 11/2010 | Zhao et al. | 455/456.3 |
| 2011/0137817 A1 | 6/2011 | Roumeliotis et al. | |

OTHER PUBLICATIONS

Coombs, Jason "Win32 API Obscurity for I/O Blocking and Intrusion Prevention", Jun. 2005.
Office Action dated Jan. 18, 2013 for U.S. Appl. No. 12/689,769.
Tobias Vejda, Ronald Toegl, Martin Pirker, and Thomas Winkler;Towards Trust Services for Language-Based Virtual Machines for Grid Computing; Graz University of Technology, Inffeldgasse 16a, A-8010 Graz, Austria.
Press Release, Veriplace Launch, Apr. 1, 2008, Wavemarket, Inc.
Veriplace Developer Guide, Apr. 1, 2008, Wavemarket, Inc.
Office Action dated Jul. 20, 2012 for U.S. Appl. No. 12/791,854.
Office Action dated May 29, 2012 for U.S. Appl. No. 12/728,174.
Office Action dated Sep. 14, 2012 for U.S. Appl. No. 12/728,174.
Office Action dated Jun. 22, 2012 for U.S. Appl. No. 12/689,769.
Office Action dated May 6, 2013 for U.S. Appl. No. 12/791,854.
Office Action Reply filed Sep. 6, 2013 for U.S. Patent Publication No. 2011/0137817 (U.S. Appl. No. 12/791,854).
Office Action dated Dec. 16, 2013 for U.S. Appl. No. 12/791,854.
Advisory Action dated Mar. 10, 2014 for U.S. Appl. No. 12/791,854.
Sanner, Python: A Programming Language for Software Integration and Development, The Scripps Research Institute, 1999.
SS Shende, AD Malony—International Journal of High Performance Computing, 2006, pp. 1-25.
Office Action dated Jun. 5, 2014 for U.S. Appl. No. 12/791,854.

* cited by examiner

SYSTEM FOR AGGREGATING AND DISSEMINATING LOCATION INFORMATION

BACKGROUND

The growing ubiquity of locatable mobile devices such as mobile telephones, cellular-enabled personal computers and GPS systems has created a demand for location-based services offering novel local content. Known location-based service applications exist to provide navigation assistance, locating of points of interest, advertising and other consumer and business-related services relevant to a current location of a user's mobile device.

While a mobile device user may be interested in the offerings of one or more location-based service applications, that user may have reservations about allowing an application provider unabridged access to the user's location information. Safety and privacy concerns may act to dissuade a potential consumer of location-based services from using a particular location-based service application able to track the position of the user's mobile device, especially in the case where the location-based service application is offered by a provider with which the consumer is unfamiliar.

Developers of applications may have their own reservations about expending the effort required to produce quality location-based service applications. Developers are often burdened by the complexity in designing applications which function effectively no matter the type of mobile device or the telecommunication carrier servicing the mobile device. Location data from a telecommunication carrier comes in many varied forms including network-originated technologies such as GPS, cell-triangulation (EOTD, AFLT, TDOA), and cell tower identity, as well as user input techniques such as address or point-of-interest entry. Dealing with such heterogeneous data sources can be crippling to the application development and maintenance process.

It would be desirable to provide a system for aggregating and disseminating location information which permits responses to location requests originating from a location-based service application server, the system addressing end user privacy concerns by controlling and limiting access to end user personal information by the location-based service application server without significantly diminishing the usability of the location-based service. Such a system should facilitate the development and maintenance of location-based service applications by addressing issues of complexity in interacting with heterogeneous data sources.

SUMMARY

The invention herein provides a computer-implemented method of aggregating and disseminating location information. The method includes establishing a user account for a user, wherein establishing the user account includes receiving identifying information of the user from the user. A user identifier is associated with the user account. A request for the user identifier is received from a remote application server, and an identifier request authorization is received from the user or the remote application server to provide the user identifier to the remote application server. The user identifier is provided to the remote application server in response to receiving the identifier request authorization. Mobile device location information of a user mobile device associated with the user identifier is received from the user mobile device or a remote telecommunication carrier server. A request for the mobile device location information of the user mobile device associated with the user identifier is received from the remote application server. A location request authorization is received from the user to provide the mobile device location information, and the user mobile device location is provided to the remote application server in response to receiving the location request authorization.

The invention further provides a system for aggregating and disseminating location information comprising a computing device including a memory comprising instructions operable to enable the computing device to perform a procedure including establishing a user account for a user, associating a user identifier with the user account, receiving from a remote application server a request for the user identifier, and receiving from the user or the remote application server an identifier request authorization to provide the user identifier to the remote application server. The instructions are further operable to enable providing the user identifier to the remote application server in response to receiving the identifier request authorization, receiving mobile device location information of a user mobile device associated with the user identifier from a remote telecommunication carrier server, receiving from the remote application server a request for the mobile device location information of the user mobile device associated with the user identifier, receiving a location request authorization from the user to provide the mobile device location information, and providing the user mobile device location to the remote application server in response to receiving the location request authorization.

The invention further provides a system for aggregating and disseminating location information including a computing device having software architecture which provides a first application program interface (API) configured to associate a user identifier with a user account, receive from a remote application server a request for the user identifier, receive from a user or the remote application server an identifier request authorization to provide the user identifier to the remote application server, and provide the user identifier to the remote application server in response to receiving the identifier request authorization. The software architecture further provides a second API configured to receive mobile device location information of a user mobile device associated with the user identifier from a remote telecommunication carrier server, receive from the remote application server a request for the mobile device location information, receive a location request authorization from the user to provide the mobile device location information, and provide the user mobile device location to the remote application server in response to receiving the location request authorization.

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

The preferred embodiments of the present invention are described below with reference to the drawing figures where like numerals represent like elements throughout.

Figure 1:
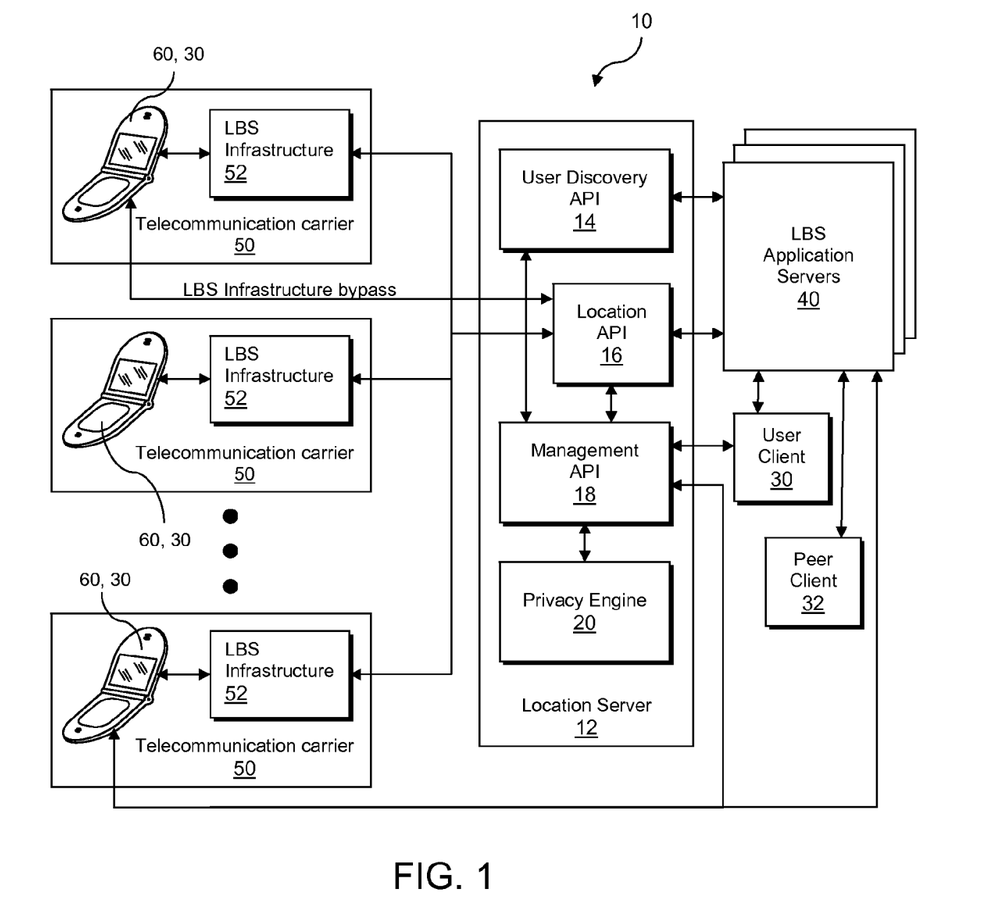
FIG. 1 is a schematic illustration of an exemplary operating environment in which a system for aggregating and disseminating location information according to a preferred embodiment of the present invention is operable.

Referring to FIG. 1, a schematic illustration of an exemplary operating environment 10 is shown in which a preferred system for aggregating and disseminating location information, in the form of a location server 12, may be used. The location server 12 includes one or more computing devices and one or more memory devices, which computing devices and memory devices may be integrally constructed or connected in any suitable manner, for example via a network. The location server 12 provides a platform which enables a user discovery application program interface (API) 14, a location API 16, a management API 18 and a privacy engine 20.

The management API 18 is configured to establish a user account using identifying information of a user. The location server 12 is configured to receive the identifying information through the management API 18 from a user client 30, such as a personal computer, mobile telephone device, or global positioning system (GPS) enabled device, via a network connection, which network connection is preferably an Internet network connection. The identifying information preferably includes at least the name of the user, a telephone number associated with a user's mobile device, and a telecommunication carrier identifier associated with the user's mobile device used to establish a connection with the telecommunication carrier. The management API 18 preferably provides an interface through a client application running on the user client 30, which client application is preferably a web client, WAPclient, Java ME™ client, BREW™ client, SMS client or other suitable client. Alternatively, the location server 12 may be configured to receive the identifying information from the user client 30 through an interface provided by the user discovery API 14. The location server 12 associates a user identifier, which is preferably randomly generated, with the user account via a privacy engine 20.

The location server 12 is configured to receive from a remote location-based service (LBS) application server 40 via the user discovery API 14 a request for the user identifier. The LBS application server 40 is connected to the user clients 30 via a network and receives from the user clients 30 requests for location-based services. The location-based services are preferably provided on the basis of the positioning of the user client 30, which as shown is preferably integrated with a mobile device 60, for example a telecommunications-enabled personal computer or mobile telephone. Alternatively, location-based services may be provided on the basis of the positioning of a mobile device with or without a user client 30, for example a mobile telephone, specified by the user through use of a user client 30, for example a stationary personal computer.

Location-based services provided by the LBS application server 40 preferably include one or more of traffic advising, network planning, navigation assistance, assistance in location of points of interest, and location-based advertising. The location services provided by the LBS application server 40 may further include providing location information regarding a user of a mobile device 60 to a another user or users of one or more other mobile devices 60 based on location preferences provided by the located user. Location services which support sharing of location information among different users may be delivered through applications compatible with or integral with web-based social networking applications such as Facebook™, Yelp™, MySpace™, and Friendster™, or alternatively, through stand alone web-based or non-web-based applications.

The location server 12 is configured to receive via the user discovery API 14 an identifier request authorization, which, depending on the application provided by the LBS application server 40 and the preference of the user, is received from either the user through the user client 30 or from the LBS application server 40. In the case where the user provides the identifier request authorization, the connection between the LBS application server 40 and the user client 30 is redirected to the user discovery API 14 by the LBS application server 40, and after the location server 12 receives the identifier request authorization from the user client 30, the connection is redirected by the location server 12 back to the LBS application server 40. In the case where the LBS application server 40 provides the identifier request authorization, the identifier request authorization is preferably provided in the form of an element of known personal information from the user including but not limited to one or more of an email address, a physical address, and a telephone number associated with the user client 30. The location server 12 is configured to provide via the user discovery API 14 the user identifier to the LBS application server 40 in response to receiving the identifier request authorization.

The location server 12 is configured to receive from a LBS infrastructure 52 of a telecommunication carrier server 50 via the location API 14 mobile device location information of a mobile device 60 connected to the LBS infrastructure 52 and associated with the user identifier, which mobile device 60 preferably includes a user client 30. The location server 12 via the management API 18 preferably accommodates the LBS infrastructures 52 of a plurality of different telecommunication carrier servers 50 which may implement or permit compatibility with various device locating technologies including but not limited to GPS, A-GPS, cell tower triangulation, and manual user entry of location parameters. Accordingly, the LBS application servers 40 need only interface with the location server 12 through the user discovery API 14 and the location API 16, without addressing the interface requirements of a particular telecommunication carrier.

The location server 12 is preferably further configured to receive mobile device location information of the mobile device 60 directly from the mobile device 60, bypassing the LBS infrastructure 52 of a telecommunication carrier, preferably through an internet connection. In such case mobile device location may be provided based on a detected IP address through which the mobile device 60 communicates, or alternatively through GPS, cell tower triangulation or other suitable locating method. In one example, a mobile device 60 configured to connect with Wi-Fi internet hot spots may connect with the location server 12, allowing the location server 12 to determine the approximate location of the mobile device 60 through a detected IP address of a Wi-Fi internet hot spot to which the mobile device is connected. In another example, a mobile device 60 may provide location information, generated locally by the mobile device 60 through signals received from GPS satellites or cell towers, to the location server 12 via a local client, for example a web, WAP, Java ME™, BREW™, SMS client on the mobile device 60.

The location server 12 preferably actively queries at pre-determined intervals the mobile device 60 or the LBS infrastructure 52 of a telecommunication carrier associated with the mobile device 60 for the mobile device location information. The frequency at which queries are made by location server 12 are preferably based on mutually acceptable preferences of the mobile device user, telecommunication carrier and LBS application server administrator.

The location server 12 is further configured to receive from the LBS application server 40 via the location API 16 a request for the mobile device location information of the user mobile device 60 associated with the pre-determined user identifier. Prior to providing the user's mobile device location to the LBS application server 40, a location request authorization must be received by the location server 12 via the location API 16 from the user through the user client 30, which as indicated above is preferably provided integral with the mobile device 60. To receive the location request authorization, the connection between the LBS application server 40 and the user client 30 is redirected to the location API 16 by the LBS application server 40. After the location server 12 receives the location request authorization from the user client 30, the connection is redirected by the location server 12 back to the LBS application server 40. The location server 12 is configured to provide the mobile device location information to the LBS application server 40 in response to receiving the location request authorization from the user client 30, and if location request authorization is not provided, no mobile device location information of the user is provided to the LBS application server 40. The location request authorization may be received from the user client 30 as an authorization to provide mobile device information one time, a predetermined number of times, for a specified time interval, until the authorization is revoked via the user client 30, or until any predetermined condition is met.

The location server 12 is configured to receive through the management API 18 an indication from the user of during which times the mobile device 60 can be located. Implementing the privacy engine 20, the location server 12 generates a database having a rules set based on the indication of the user. After receipt of the location request authorization from the user client 30, the location server 12 provides the user mobile device location to the LBS application server 40 during the times indicated by the user as set forth in the rules set maintained by the privacy engine 20, and refrains from providing the user mobile device location to the LBS application server 40 at all other times. Preferably, the location server 12 is configured to receive an indication from the user of with what frequency the user mobile device can be located, for example once every minute, once every half hour, or once every hour. Further, the location server 12 preferably can receive an indication from the user of a number of times or duration of time the mobile device location information may be provided to the LBS application server 40 after receiving the location request authorization and prior to receiving an additional location request authorization. Alternatively, the location server 12 can receive an indication from the user that the mobile device location information may be provided to the LBS application server 40 until such time as the user revokes authorization for the LBS application server 40 to receive location information.

The location server 12 can further receive an indication from the user of a level of geographic precision the user mobile device 60 can be located, and the location server 12 can provide a position of the user mobile device 60 to the LBS application server 40 with a precision selected by the user. Preferably, the location server 12 can provide the user mobile device location to the LBS application server 40, depending on the preference of the user, as a predetermined geographic area in which the user is located, without providing the exact position of the user. In a preferred embodiment, the location server 12 can provide the user mobile device location to the LBS application server 40 as a city block where the user mobile device 60 is located, as a neighborhood where the user mobile device 60 is located, as a city where the user mobile device 60 is located, or as a the state where the user mobile device 60 is located. Alternatively, the location server 12 can provide the user mobile device location to the LBS application server 40 with the precision which it is received by the location server, for example a point location including an approximated latitude and longitude. In such manner, a user can protect his or her privacy by only permitting the location server 12 to provide a level of location precision that he or she is comfortable with. Indications regarding desired geographic precision are also maintained as a rules set database by the privacy engine 20.

Indications are preferably further received by the location server 12 through the location API 16 from the associated telecommunication carrier server 50 of at which times, with what frequency and under what conditions the user mobile device 60 can be located and with what geographic precision. In such manner, a telecommunication carrier can communicate its privacy requirements to the location server 12. Indications from the telecommunication carrier server 50 are also preferably maintained as a rules set database by the privacy engine 20.

The location server 12 is further configured to receive through the location API 16 indications from the LBS application server 40 of at which times, with what frequency, and under what conditions the LBS application server 40 requires the mobile device location information. The location server 12 provides the user mobile device location to the LBS application server 40 at the times indicated, at the frequency indicated, and under the conditions specified by the LBS application server 40 when or to the extent that such times, frequency, or conditions are not conflicting with indications received from the user or the associated telecommunication carrier server 50. The location server 12 is further configured to receive an indication from the LBS application server 40 of a level of geographic precision required of the mobile device location information. The location server 12 provides the user mobile device location to the LBS application server 40 at the geographic precision indicated by the LBS application server 40 when or to the extent that such geographic precision does not conflict with indications received from the user or the associated telecommunication carrier server 50. Accordingly, the location server 12 is configured to provide the user mobile device location to the LBS application server 40 based on one or more indications from the LBS application server 40, one or more indications of the user, and one or more indications of the telecommunication carrier server 50. Preferably, the location server 12 provides the user mobile device location to the LBS application server 40 in conformance with the one or more indications of the telecommunication carrier server 50, and in conformance with the one or more indications of the user to the extent that the one or more indications of the user are not in conflict with the one or more indications of the telecommunication carrier server 50, and in conformance with the one or more indications from the LBS application server 40 to the extent that the one or more indications from the LBS application server 40 do not conflict with the one or more indications of the telecommunication carrier server 50 and the one or more indications of the user. As such, indications of the telecommunication carrier server 50 preferably take precedence over indications of the user, and indications of the telecommunication carrier server 50 and the user preferably take precedence over indications of the LBS application server 40. As one example, if the LBS application server 40 is running an application which requires for proper functionality a precise point location including an approximated latitude and longitude of a mobile device as the level of geographic precision, and the telecommunication carrier server 50 or the user permits locating the user only by the city in which the user is located, then the application cannot function and LBS application server 40 can notify the user client 30 accordingly. As another example, if the LBS application server 40 is running an application which requires for proper functionality to receive location information generally continuously without reauthorizations after an initial user authorization, and the telecommunication carrier server 50 requires reauthorization by a user each time location information is requested by an LBS application server 40 regardless of user preference, then the application cannot function and LBS application server 40 can notify the user client 30 accordingly.

The location server 12 is configured to receive from the LBS application servers 40 identifying information and to transmit the identifying information of the LBS application servers 40 to the telecommunication carrier server 50. The identifying information of the LBS application servers 40 preferably includes a publisher name or names of an application or applications running on the LBS application servers 40. Alternatively, the identifying information can include any suitable information, including information useful for determining a level trustworthiness of the LBS application servers 40. The location server 12 is further configured to transmit to the telecommunication carrier server 50 indications received from the LBS application servers 40 of at which times, with what frequency, and under what conditions each of the LBS application servers 40 require the mobile device location information. Based on the identifying information and/or the indications received from a particular LBS application server 40, the telecommunication carrier server 50 can transmit to the location server 12 indications of at which times, with what frequency, under what conditions, and with what geographic precision a user mobile device 60 can be located by the particular LBS application server 40 or a particular application running on the particular LBS application server 40. In such a manner, a telecommunication carrier 50 can for different LBS application servers 40 provide different indications of at which times, with what frequency, under what conditions, and with what geographic precision a user mobile device 60 can be located. For example, a LBS application server 40 considered to be trusted may be permitted via the telecommunication carrier server 50 to receive location information of the mobile device 60 at a higher precision than a LBS application server 40 considered to be non-trusted based on the identifying information of the LBS application server 40.

The location server 12 preferably transmits to each LBS application server 40 indications received from the telecommunication carrier server 50 of at which times, with what frequency, under what conditions, and with what geographic precision a user mobile device 60 can be located by each LBS application server 40. A LBS application server 40 is therefore able to communicate to a user whether an application running on the LBS application server 40 is compatible with the indications of the telecommunication carrier server 50 associated with the user's mobile device 60, for example whether the indications of the telecommunication carrier server 50 are too restrictive to permit an application to function properly. Alternatively, the location server 12 can communicate to a user whether an application running on the LBS application server 40 is compatible with the indications of the telecommunication carrier server 50 associated with the user's mobile device 60.

The location server 12 is further configured to receive from the LBS application server 40 via the location API 16 a request for an authorization to provide the mobile device location information to a peer. The peer is preferably another user who uses the mobile device location information of the mobile device 60 for interaction with an application running on the LBS application server 60. Such application may include for example a game which requires users to exchange location information in the process of playing the game. A permission is received by the location server 12 via the location API 16 from the user through the user client 30 to provide the mobile device location information to the peer. In response to the received permission, the location server 12 provides to the remote application server 40 the authorization to provide the mobile device location information to the peer.

Figure 2:
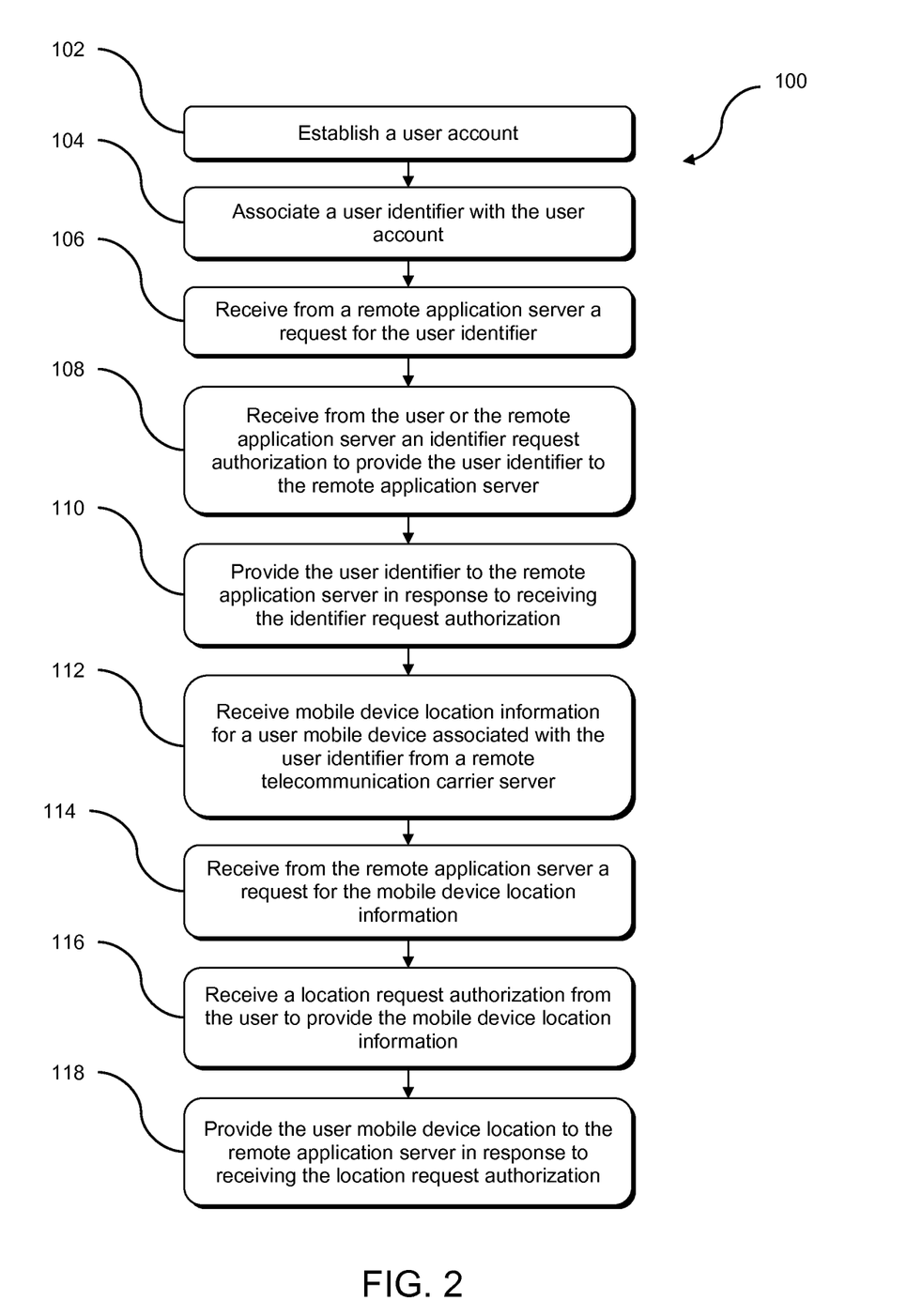
FIG. 2 is a flow chart showing a computer-implemented method of aggregating and disseminating location information according to a preferred embodiment of the present invention.

Referring to FIG. 2, a computer-implemented method 100 of aggregating and disseminating location information according to a preferred embodiment of the present invention is shown. Such method is preferably implemented by the location server 12 shown in FIG. 1. Alternatively, any suitable computing system may be configured to implement the method 100. The method 100 includes establishing a user account (step 102) and associating a user identifier with the user account (step 104). A request for the user identifier is received from a remote application server (step 106). An identifier request authorization is received from the user or the remote application server to provide the user identifier to the remote application server (step 108). The user identifier is provided to the remote application server in response to receiving the identifier request authorization (step 110). Mobile device location information of a user mobile device associated with the user identifier is received from a remote telecommunication carrier server (step 112). A request for the mobile device location information of the user mobile device associated with the user identifier is received from the remote application server (step 114). A location request authorization is received from the user to provide the mobile device location information (step 116), and the user mobile device location is provided to the remote application server in response to receiving the location request authorization (step 118).

Figure 3:
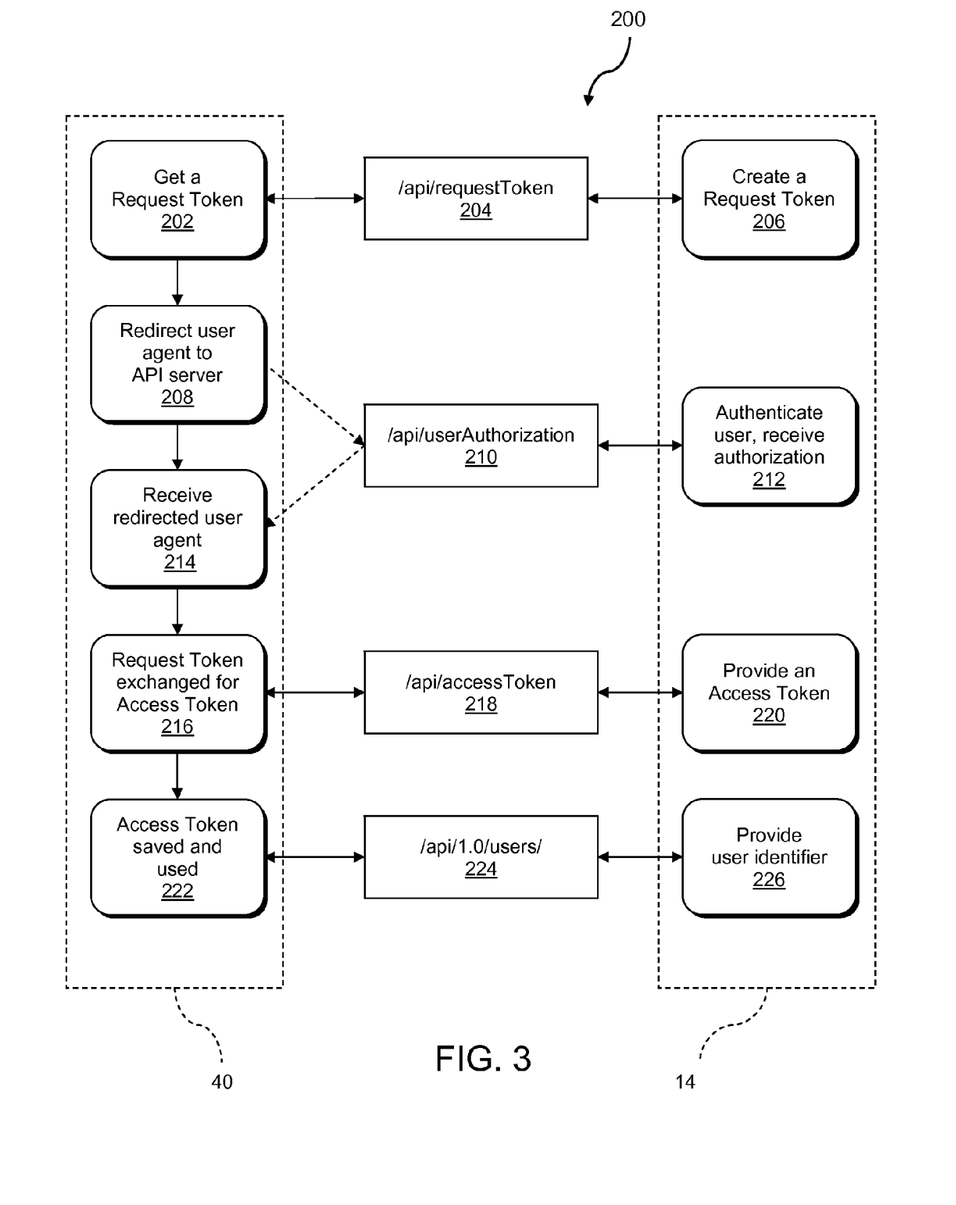
FIG. 3 is a workflow diagram showing interactions between a user discovery application program interface (API) according to a preferred embodiment of the invention and a remote location-based services (LBS) application server.

Referring to FIG. 3, a workflow 200 supported by the location server 12 and implemented by the user discovery API 14 according to the preferred embodiment of the present invention referred to in FIG. 1 is shown. The LBS application server 40 directs a request for a request token (step 202) through a request token URL 204 provided by the user discovery API 14. The location server 12, via the user discovery API 14 creates a request token (step 206) which is provided to the LBS application server 40 in response to the LBS application server's request. If required by a user or a user's telecommunication carrier, or if necessitated by a particular application, a user agent is redirected by the LBS application server 40 to the location server 12 (step 208) through a user authorization URL 210 provided by the user discovery API 14 which implements a suitable web interface or other interface to permit the user to enter required authorization. The location server 12, via the user discovery API 14 authenticates the user, shows the user the user's privacy settings, receives the identifier request authorization from the user, and redirects the user agent back to the LBS application server 40 (step 212). The LBS application server 40 receives the redirected user agent (step 214) and provides the request token, as associated with the identifier request authorization from the user, to the location server 12 through an access token URL 218 provided by the user discovery API 14 (step 216). The location server 12 provides an access token to the LBS application server 40 in exchange for receiving the authorized request token (step 220). The LBS application server 40 saves the access token and presents the access token to the location server 12 (step 222) through an identity URL 224, and the location server 12 provides the user identifier to the LBS application server 40 in response to receiving the access token (step 226). The access token is preferably revoked immediately or within a predetermined time period after the user identifier is provided to the LBS application server 40.

In the case where user authorization is not required as a prerequisite for providing the user identifier to the LBS application server 40, for example in instances where a user has already provided identifying information to the LBS application server 40, steps 202, 206, 208, 212, 214, 216 and 220 are omitted. In such case, the LBS application server 40 preferably provides an application-specific access token in the step 222 which includes identifying information previously provided to the LBS application server 40 by the user in order to retrieve the user's user identifier.

Figure 4:
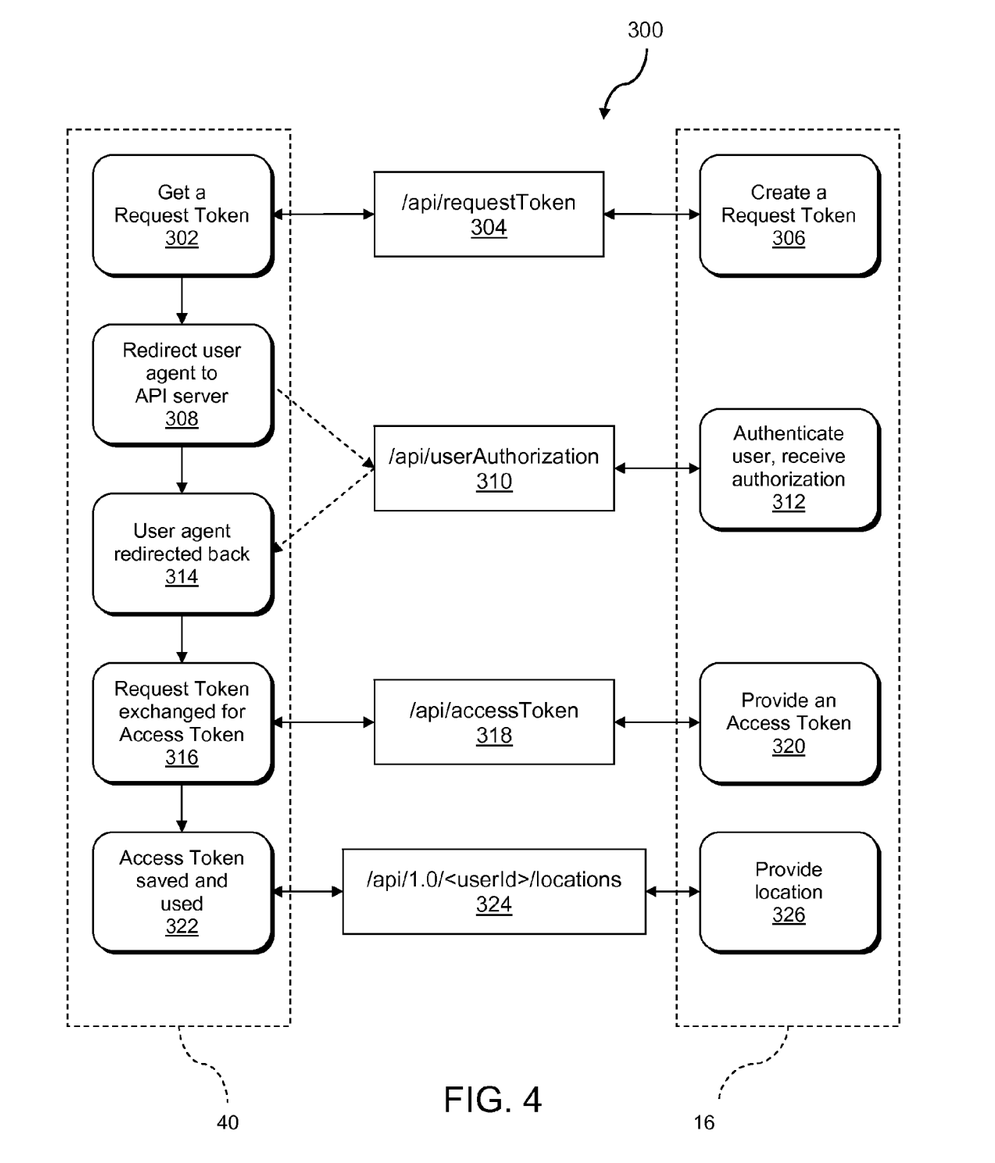
FIG. 4 is a workflow diagram showing interactions between a location application program interface (API) according to a preferred embodiment of the invention and a remote location-based services (LBS) application server.

Referring to FIG. 4, a workflow 300, which preferably follows in time the workflow 200 of FIG. 3, supported by the location server 12 and implemented by the location API 16 according to the preferred embodiment of the present invention referred to in FIG. 1 is shown. The LBS application server 40 directs a request for a request token (step 302), including the user identifier, through a request token URL 304 provided by the location API 16. The location server 12, via the location API 16 creates a request token (step 306) which is provided to the LBS application server 40 in response to the LBS application server's request. The user agent is redirected by the LBS application server 40 to the location server 12 (step 308) through a user authorization URL 310 provided by the location API 16 which implements a suitable web interface or other interface to permit the user to enter required authorization. The location server 12, via the location API 16 authenticates the user, shows the user the user's privacy settings, receives the location request authorization from the user, and redirects the user agent back to the LBS application server 40 (step 312). The LBS application server 40 receives the redirected user agent (step 314) and provides the request token, as associated with the location request authorization from the user, to the location server 12 through an access token URL 318 provided by the location API 16 (step 316). The location server 12 provides an access token to the LBS application server 40 in exchange for receiving the authorized request token (step 320). The LBS application server 40 saves the access token and presents the access token to the location server 12 (step 322) through a location URL 324, and the location server 12 provides the user mobile device location, which may include new or updated location information, to the LBS application server 40 in response to receiving the access token (step 326). The access token is preferably revoked immediately or within a predetermined time period after the user mobile device location is provided to the LBS application server 40.

Figure 5:
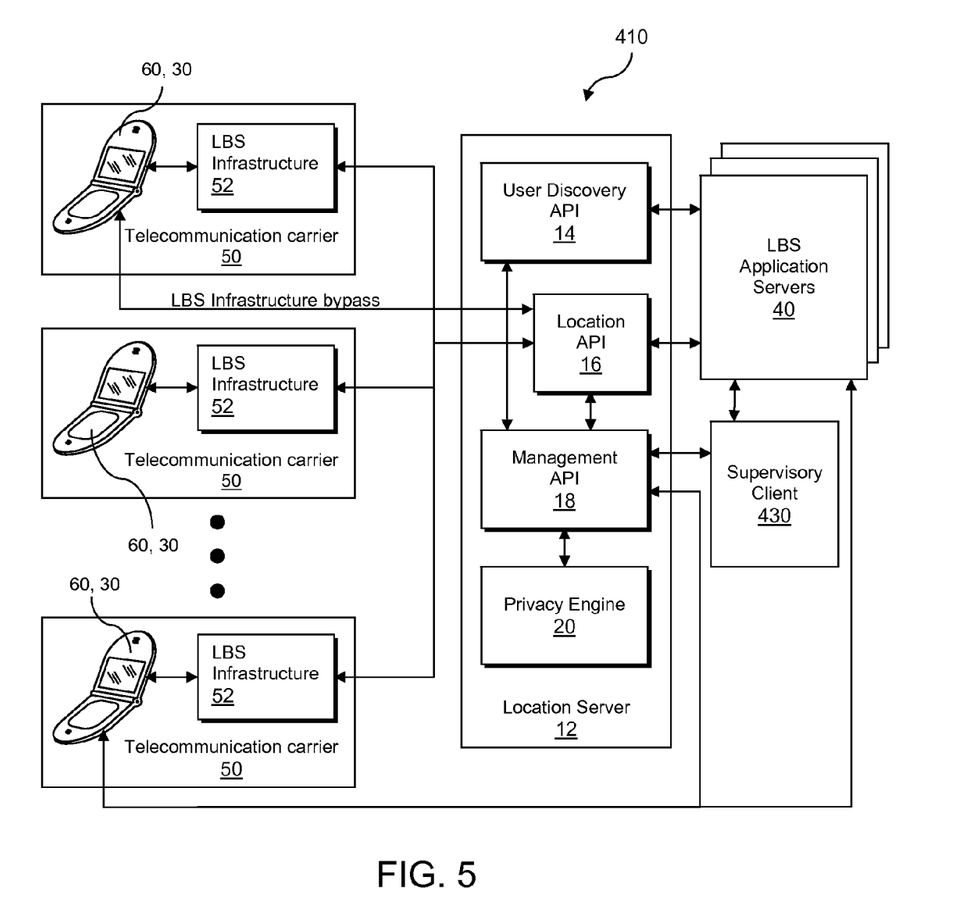
FIG. 5 is a schematic illustration of another exemplary operating environment in which a system for aggregating and disseminating location information according to a preferred embodiment of the present invention is operable.

Referring to FIG. 5, a schematic illustration of another exemplary operating environment 410 is shown in which the location server 12 may be used. Within the operating environment 410, the location server 12 is configured to receive a permission from a supervisory user, preferably another user who is in a position of authority relative to the user of the user mobile device 60, through a supervisory client 430 via the management API 18. The supervisory user may include for example a primary account holder under a mobile device service contract through which communication services are provided by the telecommunication carrier 50 to one or more user mobile devices 60. The location server 12 is preferably configured to provide the user identifier to the LBS application server 40 in response to receiving both the permission from the supervisory client 430 and the identifier request authorization from the user client 30 or the LBS application server 40 as described above. The location server 12 is preferably further configured to provide the mobile device location information to the LBS application server 40 in response to receiving both the permission from the supervisory client 430 and the location request authorization from the user client 30. Accordingly, the location server 12 must receive the permission from the supervisory client 430, the identifier request authorization, and the location request authorization prior to providing the mobile device location information to the LBS application server 40.

The location server 12 through the management API 18 transmits a request to the supervisory client 430 to provide the permission for a particular LBS application server 40 in response to receiving the identifier request authorization from the user client 30 or the LBS application server 40, or in response to receiving the location request authorization from the user client 30. Alternatively, the location server 12 transmits the request to the supervisory client 430 to provide the permission in response to receiving any suitable indication from the user client 30 that the supervised user desires to provide location information of the user mobile device 60 to a particular LBS application server 40. In this manner, a parent or other person or entity in a supervisory role over a supervised user may exercise control over which LBS application servers 40 have access to the supervised user's location, and consequently, what types of location applications the supervised user may use. Preferably, after the location server 12 receives the identifier request authorization, location request authorization or other suitable indication from the user client 30 that the user desires to provide location information to a particular LBS application server 40, the location API 16 enters a pending status until such time as the permission is received from the supervisory client 430. If the permission is not received from the supervisory client 430 within a predetermined period of time or if an indication is received from the supervisory client 430 that a permission is denied, the location server 12 ceases acceptance of a permission from the supervisory client 430 and transmits an indication of a denial to the user client 30 via the management API 18. The supervisory user through the supervisory client 430 is preferably required to provide login credentials to the management API 18 prior to providing the permission or providing an indication that an indication is denied.

While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A computer-implemented method of aggregating and disseminating location requests comprising:

establishing a user account for a user, wherein establishing the user account comprises receiving identifying information of the user from the user;

associating a user identifier with the user account;

receiving from a remote application server a request for the user identifier;

receiving from the user an identifier request authorization to provide the user identifier to the remote application server;

providing the user identifier to the remote application server in response to receiving the identifier request authorization;

receiving mobile device location information of a user mobile device associated with the user identifier from at least one of the user mobile device and a remote telecommunication carrier server;

receiving from the remote application server a request for the mobile device location information of the user mobile device associated with the user identifier;

receiving a location request authorization from the user to provide the mobile device location information; and providing the user mobile device location to the remote application server in response to receiving the location request authorization from the user.

2. The computer-implemented method of claim 1, wherein the establishing the user account comprises receiving a name of the user, receiving a telephone number of the user, and receiving a telecommunication carrier identifier.

3. The computer-implemented method of claim 1, wherein the associating the user identifier with the user account comprises associating a unique user identifier with the user account.

4. The computer-implemented method of claim 1, further comprising:
connecting to the user mobile device through a redirection from the remote application server and receiving the identifier request authorization from the user through the connection to the user mobile device; and
redirecting the user mobile device connection to the remote application server.

5. The computer-implemented method of claim 1, further comprising:
connecting to the user mobile device through a redirection from the remote application server and receiving the location request authorization from the user through the connection to the user mobile device; and
redirecting the user mobile device connection to the remote application server.

6. The computer-implemented method of claim 1, further comprising:
receiving an indication from the user of during which times the user mobile device can be located; and
providing the user mobile device location to the remote application server during the times indicated by the user and refraining from providing the user mobile device location to the remote application server at all other times.

7. The computer-implemented method of claim 1, further comprising
receiving an indication from the user of with what frequency the user mobile device can be located; and
providing the user mobile device location to the remote application server at the frequency indicated by the user.

8. The computer-implemented method of claim 1, further comprising
receiving an indication from the user of a number of times the mobile device location information may be provided to the remote application server after receiving the location request authorization and prior to receiving an additional location request authorization; and
providing the user mobile device location to the remote application server the number of times indicated by the user.

9. The computer-implemented method of claim 1, further comprising
receiving an indication from the user of a level of geographic precision at which the user mobile device can be located; and
providing the user mobile device location to the remote application server at the level of geographic precision indicated by the user.

10. The computer-implemented method of claim 1, further comprising
receiving an indication from the remote application server of with what frequency the remote application server requires the mobile device location information; and
providing the user mobile device location to the remote application server at the frequency indicated by the remote application server.

11. The computer-implemented method of claim 1, further comprising:
receiving an indication from the remote application server of a level of geographic precision required of the mobile device location information; and
providing the user mobile device location to the remote application server at the level of geographic precision indicated by the remote application server.

12. The computer-implemented method of claim 1, further comprising
receiving an indication from the telecommunication carrier server of with what frequency the remote application server is permitted the mobile device location information; and
providing the user mobile device location to the remote application server at the frequency indicated by the telecommunication carrier server.

13. The computer-implemented method of claim 1, further comprising
receiving identifying information of the remote application server;
transmitting the identifying information of the remote application server to the remote telecommunication carrier server;
receiving an indication from the telecommunication carrier server of at least one of a time period the remote application server is permitted the mobile device location information and a level of geographic precision at which the user mobile device can be located by the remote application server; and
transmitting the indication from the telecommunication carrier server to the remote application server.

14. The computer-implemented method of claim 1, further comprising:
providing a request token to the remote application server;
associating the user identifier request authorization with the request token to authorize the request token;
receiving the authorized request token from the remote application server;
providing an access token to the remote application server in response to receiving the request token;
receiving the access token from the remote application server; and
providing the user identifier to the remote application server in response to receiving the access token.

15. The computer-implemented method of claim 1, further comprising:

providing a request token to the remote application server in response to receiving the user identifier;

connecting to the user mobile device through a redirection from the remote application server and receiving the location request authorization from the user through the connection to the user mobile device;

redirecting the connection to the user mobile device to the remote application server;

associating the location request authorization with the request token to authorize the request token;

receiving the authorized request token from the remote application server;

providing an access token to the remote application server in response to receiving the request token;

receiving the access token from the remote application server; and providing the user mobile device location to the remote application server in response to receiving the access token.

16. The computer-implemented method of claim 1, further comprising:

receiving the request for the user identifier via a first application program interface (API);

receiving the mobile device location information via a second API; and receiving the request for the mobile device location information from the second API.

17. The computer-implemented method of claim 1, further comprising:

providing at least one of a web interface and a WAP interface; and receiving at least one of the identifier request authorization and the location request authorization through the web interface.

18. The computer-implemented method of claim 1, further comprising querying at predetermined intervals at least one of the user mobile device and the remote telecommunication carrier server to transmit the location information of the user mobile device.

19. The computer-implemented method of claim 1, further comprising:

receiving from another user a permission; and providing the user mobile device location to the remote application server in response to receiving the permission of the another user.

20. The computer-implemented method of claim 1, further comprising:

receiving an indication from the user that to provide the user mobile device location to the remote application server;

transmitting a request to another user to generate a permission to transmit the user mobile device location to the remote application server;

receiving from the another user the permission to provide the user mobile device location to the remote application server; and providing the user mobile device location to the remote application server in response to receiving the permission of the another user.

21. The computer-implemented method of claim 1, further comprising receiving the mobile device location information of the user mobile device at predetermined time intervals.

22. The computer-implemented method of claim 1, further comprising:

receiving from the remote application server a request for an authorization to provide the mobile device location information to a peer;

receiving from the user a permission to provide the mobile device location information to the peer; and providing to the remote application server the authorization to provide the location information to the peer in response to receiving the permission from the user.

23. A system for aggregating and disseminating location information comprising at least one computing device including at least one memory comprising instructions operable to enable the computing device to perform a procedure comprising:

establishing a user account for a user, wherein establishing the user account comprises receiving identifying information of the user from the user;

associating a user identifier with the user account;

receiving from at least one remote application server a request for the user identifier;

receiving from the user an identifier request authorization to provide the user identifier to the at least one remote application server;

providing the user identifier to the at least one remote application server in response to receiving the identifier request authorization;

receiving mobile device location information of a user mobile device associated with the user identifier from at least one of the user mobile device and a remote telecommunication carrier server;

receiving from the at least one remote application server a request for the mobile device location information of the user mobile device associated with the user identifier;

receiving a location request authorization from the user to provide the mobile device location information; and providing the user mobile device location to the at least one remote application server in response to receiving the location request authorization from the user.

24. The system of claim 23, wherein the memory further comprises instructions operable to enable the computing device to:

receive from the user at least one of an indication of when the user mobile device can be located and an indication of a level of geographic precision at which the user mobile device can be located;

generate a database comprising a rules set comprising the at least one of the indication of when the user mobile device can be located and the indication of the level of geographic precision at which the user mobile device can be located; and access the rules set database and provide the user mobile device location adhering to the rules set.

25. The system of claim 23, wherein the memory further comprises instructions operable to enable the computing device to:

receive identifying information of the at least one remote application server, wherein the at least one remote application server comprises a plurality of remote application servers;

transmit the identifying information of the plurality of remote application servers to the remote telecommunication carrier server;

receive from the remote telecommunication carrier server at least one of an indication of a time period when the user mobile device can be located by the plurality of remote application servers and an indication of a level of geographic precision at which the user mobile device can be located by the plurality of remote application servers, wherein different ones of the plurality of remote application servers are associated with at least one of different indications of a time period when the user mobile device can be located and different indications of a level of geographic precision at which the user mobile device can be located; and provide the user mobile device location to the plurality of remote application servers at least one of at the level of geographic precision indicated by the remote telecommunication carrier server and a time period when indicated by the remote telecommunication carrier server.

26. The system of claim 25, wherein the memory further comprises instructions operable to enable the computing device to transmit to the plurality of remote application servers the at least one of the indication from the remote telecommunication carrier server of a time period when the user mobile device can be located and the indication from the remote telecommunication carrier server of a level of geographic precision at which the user mobile device can be located, wherein different ones of the plurality of remote application servers receive at least one of different indications of a time period when the user mobile device can be located and different indications of a level of geographic precision at which the user mobile device can be located.

27. A system for aggregating and disseminating location information comprising at least one computing device, the at least one computing device comprises a software architecture comprising:

a first application program interface (API) configured to associate a user identifier with a user account, receive from a remote application server a request for the user identifier, receive from a user an identifier request authorization, and provide the user identifier to the remote application server in response to receiving the identifier request authorization; and a second API configured to receive mobile device location information of a user mobile device associated with the user identifier from a remote telecommunication carrier server, receive from the remote application server a request for the mobile device location information, receive a location request authorization from the user, and provide the user mobile device location to the remote application server in response to receiving the location request authorization from the user.

28. The system of claim 27, wherein the software architecture of the at least one computing device further comprises a privacy engine configured to generate a rules set based on at least one indication of the user and configured to provide the user mobile device location to the remote application server according to the rules set indicated by the user.

29. The system of claim 27, wherein the software architecture of the at least one computing device further comprises a privacy engine configured to generate a rules set based on at least one indication of the user and to provide the user mobile device location to the remote application server according to the rules set indicated by the user, wherein the rules set comprises an indication of when the user mobile device can be located.

30. The system of claim 27, wherein the software architecture of the at least one computing device further comprises a privacy engine configured to generate a rules set based on at least one indication of the user and to provide the user mobile device location to the remote application server according to the rules set indicated by the user, wherein the rules set comprises an indication of a level of geographic precision at which the user mobile device can be located.

* * * * *